(12) United States Patent
Nakamura

(10) Patent No.: US 6,754,514 B1
(45) Date of Patent: Jun. 22, 2004

(54) PORTABLE MOBILE RADIO TELEPHONE APPARATUS

(75) Inventor: Futoshi Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/521,564

(22) Filed: Mar. 9, 2000

(30) Foreign Application Priority Data

Apr. 16, 1999 (JP) ............................................ 11/109290

(51) Int. Cl.[7] .......................... H04B 1/38; H04M 1/00
(52) U.S. Cl. ............................ 455/575.3; 455/575.1; 455/90.3; 379/446; 379/454; 379/433.13
(58) Field of Search ................................. 379/446, 454, 379/433.13; 455/575, 90

(56) References Cited

U.S. PATENT DOCUMENTS

| | | | | |
|---|---|---|---|---|
| 5,384,844 A | * | 1/1995 | Rydbeck | 379/433 |
| 5,926,748 A | * | 7/1999 | Yoshihara et al. | 455/90 |

FOREIGN PATENT DOCUMENTS

| | | | | |
|---|---|---|---|---|
| EP | 0 932 289 A2 | | 7/1999 | |
| GB | 0932289 | * | 7/1999 | H04M/1/02 |
| JP | 4-276957 | | 10/1992 | |
| JP | 6-23337 | | 3/1994 | |
| JP | 6-216621 | | 8/1994 | |
| JP | 06216621 | * | 8/1994 | H01Q/1/24 |
| JP | 8-126050 | | 5/1996 | |
| JP | 9-64778 | | 3/1997 | |
| JP | 8-186629 | | 6/1997 | |
| JP | 10-98514 | | 4/1998 | |
| JP | 10-150480 | | 6/1998 | |

* cited by examiner

*Primary Examiner*—Lee Nguyen
*Assistant Examiner*—Eugene Yun
(74) *Attorney, Agent, or Firm*—Scully, Scott, Murphy & Presser

(57) ABSTRACT

A portable type mobile radio telephone apparatus according to the present invention prevents the deterioration of antenna characteristics and obtains transmission/reception characteristics with stable sensitivity, thereby making it possible to stably call and receive a call. The apparatus comprises an antenna for transmitting and receiving radio waves, a transmitter/receiver portion including a microphone/speaker, and a flip board which covers a manipulation portion and freely opens and closes to have an opening/closing range of 270 degrees or more about an opening/closing axis at a lower portion of the flip board. The flip board may have a rotational axis for opening and closing at a lower portion of a back surface of the apparatus and cover a manipulation surface of a manipulation portion and a lower portion of the apparatus. Alternatively, the flip board may have a rotational axis for opening and closing at a lower portion of a front surface of the manipulation portion, and the angle between the manipulation surface of the manipulation portion and an edge of the lower portion of the front surface may be at 60 to 90 degrees. Additionally, the flip board may have a shape with a bend at an angle of 90 to 110 degrees corresponding to the manipulation surface of the manipulation portion and a lower edge surface the apparatus or a streamlined shape to locate a rotational axis of the flip board which freely opens and closes at a lower portion of the back surface of the apparatus. The flip board which freely opens and closes has a two-level or three-level stopper.

4 Claims, 5 Drawing Sheets

PORTABLE MOBILE RADIO TELEPHONE APPARATUS

BACKGROUND OF THE INVENTION

1. Field of the Invention

The present invention relates generally to a portable mobile radio telephone apparatus, and more particularly to a structure of a portable mobile radio telephone apparatus which can be stably placed in an upright state.

2. Description of the Related Art

With the widespread use of portable mobile telephone systems, a portable mobile radio telephone apparatus requires a smaller size and lighter weight, specifically, requires improvements in radio characteristics, i.e. antenna sensitivity.

FIG. 1 shows an appearance of a prior art portable mobile radio telephone apparatus used in portable mobile telephone systems. Prior art portable mobile radio telephone apparatus 10 has flip board 11 which can only be closed during standby or be opened to a position at 90 to 180 degrees during a call with a two-level stopper. Therefore, it is impossible to stably place portable mobile radio telephone apparatus 10 in an upright state but portable mobile radio telephone apparatus 10 can only be placed in a laid state as shown in FIG. 1.

When portable mobile radio telephone apparatus 10 is placed in a laid state on metal-based material 12, antenna 2 approaches metal plate 12 to deteriorate the sensitivity of antenna 2. This adversely affects the radio characteristics of the portable mobile radio telephone apparatus to deteriorate the sensitivity of portable mobile radio telephone apparatus 10, thereby presenting a problem which requires technical improvements, i.e. difficulty of operations such as originating a call, receiving a call or performing data communication.

Laid-open Utility Model Registration Application No. 6-23337 discloses an example in which a portable telephone is provided with a leg for allowing a portable telephone body to be placed in an upright state for making a call in a hand free mode. However, manipulations for placing the telephone body in an upright state involve opening a hidden bottom plate frontward, pulling a support frame mounted within the bottom plate, and fitting the support frame to a projection on the front surface of the body for placement in an upright state, which manipulations are not so easy.

Particularly, since portable mobile radio telephone apparatuses are often used recently in connection with portable mobile terminals, it is essential that a portable mobile radio telephone apparatus is placed in a stably upright state for operating a manipulation unit of a portable mobile terminal.

SUMMARY OF THE INVENTION

It is an object of the present invention to provide a portable mobile radio telephone apparatus which is placed in a stably upright state, prevents the deterioration of antenna characteristics of the portable mobile radio telephone apparatus, and obtains stable reception sensitivity and transmission characteristics, thereby making it possible to stably call and receive a call.

The portable mobile radio telephone apparatus according to the present invention is characterized in that, in a portable type mobile radio telephone apparatus having an antenna for transmitting and receiving radio waves, a transmitter/receiver portion including a microphone/speaker, and a flip board which covers a manipulation portion and freely opens and closes, it has flip board opening/closing means which has an opening/closing range of 270 degrees or more about a rotational axis of the flip board for ensuring a distance between the antenna and a placement surface.

The flip board opening/closing means has a rotational axis for opening and closing at a lower portion of a front surface of the manipulation portion and arranges the angle between a manipulation surface of the manipulation portion and an edge of the lower portion of the front surface at an angle smaller than 90 degrees and greater than 60 degrees.

The flip board opening/closing means may have a rotational axis for opening and closing at a lower portion of a back surface of the apparatus and cover the manipulation surface of the manipulation portion and a lower portion of the apparatus.

Alternatively, the flip board opening/closing means may have a shape with a bend at an angle of 90 to 110 degrees corresponding to the manipulation surface of the manipulation portion and a lower edge surface of the apparatus or a streamlined shape to locate a rotational axis of the flip board which freely opens and closes at a lower portion of the back surface of the apparatus.

Additionally, the flip board opening/closing means has a two-level stopper or a three-level stopper.

In the present invention, the portable type mobile radio telephone apparatus has a flip board which freely opens and closes and which has an opening/closing range of 270 degrees or more about a rotational axis at a lower portion of the flip board, and has means for easily allowing stably upright placement. Thus, the distance between the antenna for transmitting and receiving radio waves and a placement surface is increased to improve the deterioration of antenna characteristics and to increase favorite visibility of a display portion.

A first effect of the present invention is that the distance between the antenna of the portable mobile radio telephone apparatus and a material (for example, metal plate) at a position where the portable mobile radio telephone apparatus is placed is increased to prevent the deterioration of antenna characteristics and to obtain transmission/reception characteristics with stable sensitivity, thereby making it possible to reliably call and receive a call.

A second effect of the present invention is that data communication can be stably operated in a portable mobile radio telephone apparatus to which a connector for data communication cable is connected at a front surface, back surface, side surface or top surface thereof as shown in FIG. 8.

DESCRIPTION OF THE PREFERRED EMBODIMENTS

Next, embodiments of the present invention will be described in detail with reference to the drawings.

Figure 2:
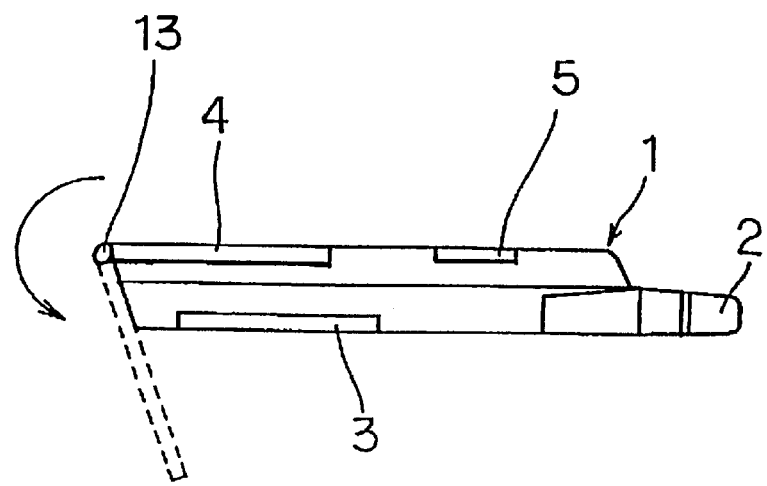
FIG. 2 is a diagram illustrating a first embodiment of the present invention and showing a configuration from a side thereof.
Figure 3:
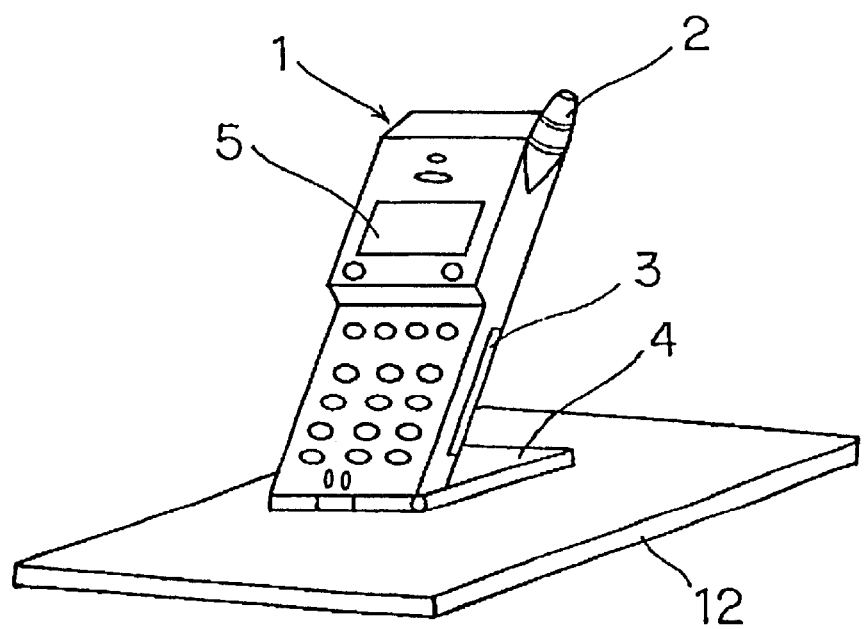
FIG. 3 is a diagram showing the first embodiment of the present invention in a state where a flip board is opened for upright placement.

Referring to FIG. 2, there is shown portable mobile radio telephone apparatus 1 (hereinafter referred to as portable unit 1) which can be easily placed upright anywhere as shown in FIG. 3 by opening flip board 4 which freely opens and closes at 270 degrees or more about a rotational axis at a lower portion of flip board 4.

A first embodiment of the present invention will be described with reference to FIGS. 2 and 3. In FIG. 2, portable unit 1 comprises antenna 2, battery 3, flip board 4 which freely opens and closes, display portion 5, and rotational axis 13.

As shown in FIG. 2, flip board 4 covers a manipulation portion, and rotational axis 13 of flip board 4 is located in a lower portion of a front surface of a body of the apparatus. The angle between the surface of flip board 4 covering the manipulation portion and a lower edge of the apparatus body is smaller than 90 degrees. When flip board 4 is opened and rotated 270 degrees or more, flip board 4 comes into contact with the lower edge of the apparatus, and stably upright placement is enabled as shown in FIG. 3. The angle from the lower edge of the apparatus body is formed to be smaller than 90 degrees and greater than 60 degrees.

Figure 4:
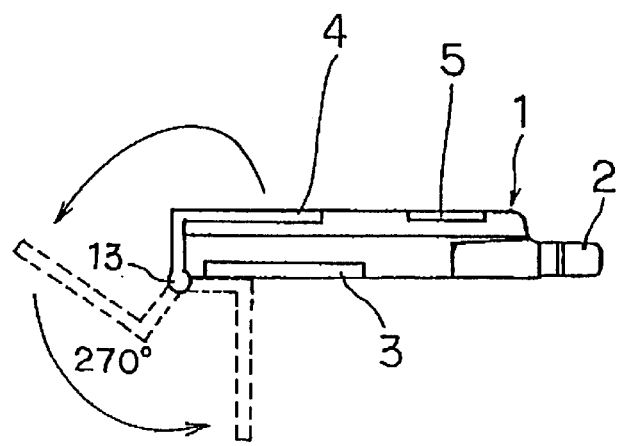
FIG. 4 is a diagram illustrating a second embodiment of the present invention and showing a configuration from a side thereof.

A second embodiment of the present invention will be described with reference to FIGS. 4 and 5. In FIG. 4, portable unit 1 comprises antenna 2, battery 3, flip board 4 which freely opens and closes, display portion 5, and rotational axis 13.

Figure 5:
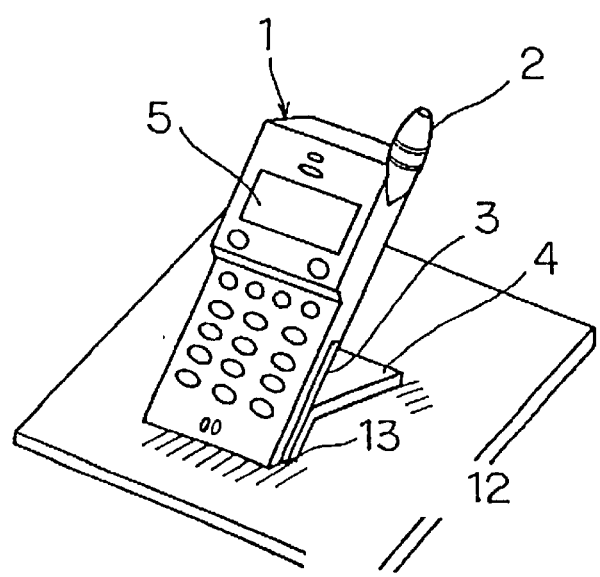
FIG. 5 is a diagram showing the second embodiment of the present invention in a state where a flip board is opened for upright placement.

As shown in FIG. 4, flip board 4 is formed to have a shape with a bend at about 90 degrees and to have rotational axis 13 at a lower portion on the side of a back surface (battery 3 side) of portable unit 1 to allow the opening at 270 degrees or more, thereby enabling stably upright placement as shown in FIG. 5.

Figure 6:
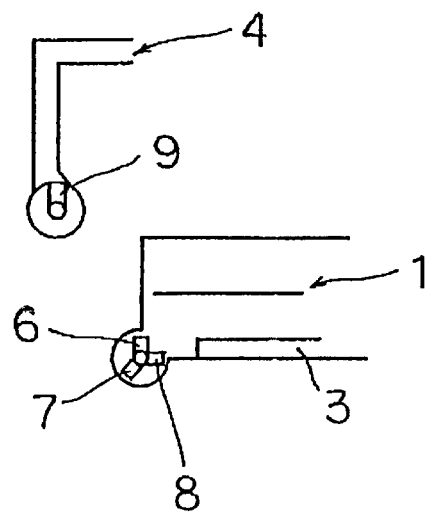
FIG. 6 is a diagram showing a stopper of a flip board which freely opens and closes.

As shown in FIG. 6, portable unit 1 of the second embodiment of the present invention has grooves 6, 7 and 8 for first, second and third stoppers at the rotational axis of flip board 4 which freely opens and closes, and has tab 9 at the rotational axis on the side of flip board 4 which freely opens and closes. Portable unit 1 of the first embodiment of the present invention has grooves 6 and 7 (not shown) for first and second stoppers at the rotational axis of flip board 4 which freely opens and closes, and has tab 9 (not shown) at the rotational axis on the side of open/close flip board 4. The respective grooves and tabs are reversely used.

Figure 1:
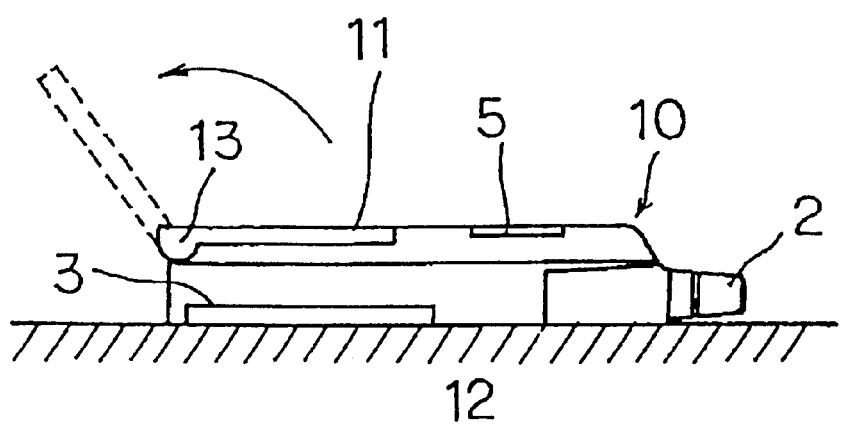
FIG. 1 is a diagram showing an appearance of a prior art portable mobile radio telephone apparatus used in a portable mobile telephone system.

As shown in FIG. 6, flip board 4 which freely opens and closes has first, second and third stoppers 6, 7 and 8. Flip board 4 is fixed at a closed position with fist stopper 6 during standby when portable unit 1 is carried. Flip board 4 is fixed at a position at 90 to 180 degrees with second stopper 7 during a call, similarly to a prior art open/close flip board (11 in FIG. 1).

Flip board 4 is opened at 270 degrees with third stopper 8 during standby when portable unit 1 is not carried, and portable unit 1 can be easily placed upright anywhere.

The aforementioned three stoppers are formed such that one tab 9 is provided at a rotating portion of flip board 4 and three grooves 6, 7 and 8 are provided at a rotating portion on the side of portable unit 1. Said tab 9 and grooves 6, 7 and 8 are of triangular or semicircular shape to allow easy attachment and removal.

The configuration as described above ensures the opening range of 270 degrees or more for flip board 4 to open flip board 4 to the back surface side (battery 3 side) of portable unit 1, thereby allowing portable unit 1 to be easily placed upright.

Figure 7:
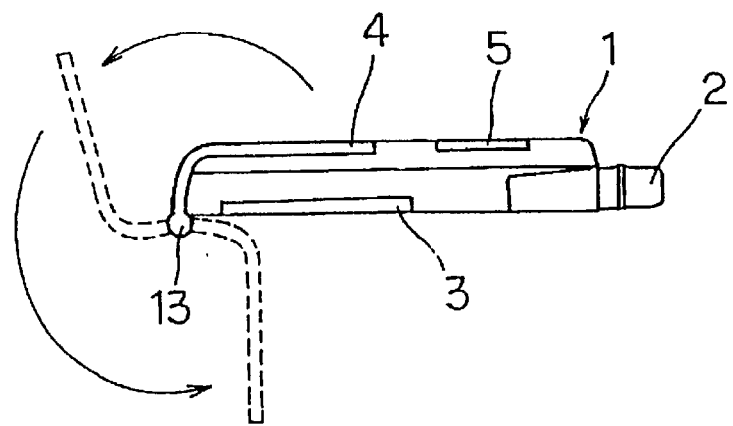
FIG. 7 is a diagram illustrating a third embodiment of the present invention and showing a configuration from a side thereof.

As shown in FIG. 7, with flip board 4 formed not to have a shape with a 90 degree bend but to have a streamline shape, rotational axis 13 is located on the back surface side (battery 3 side) to allow the opening at 270 degrees or more, thereby enabling stably upright placement.

Figure 8:
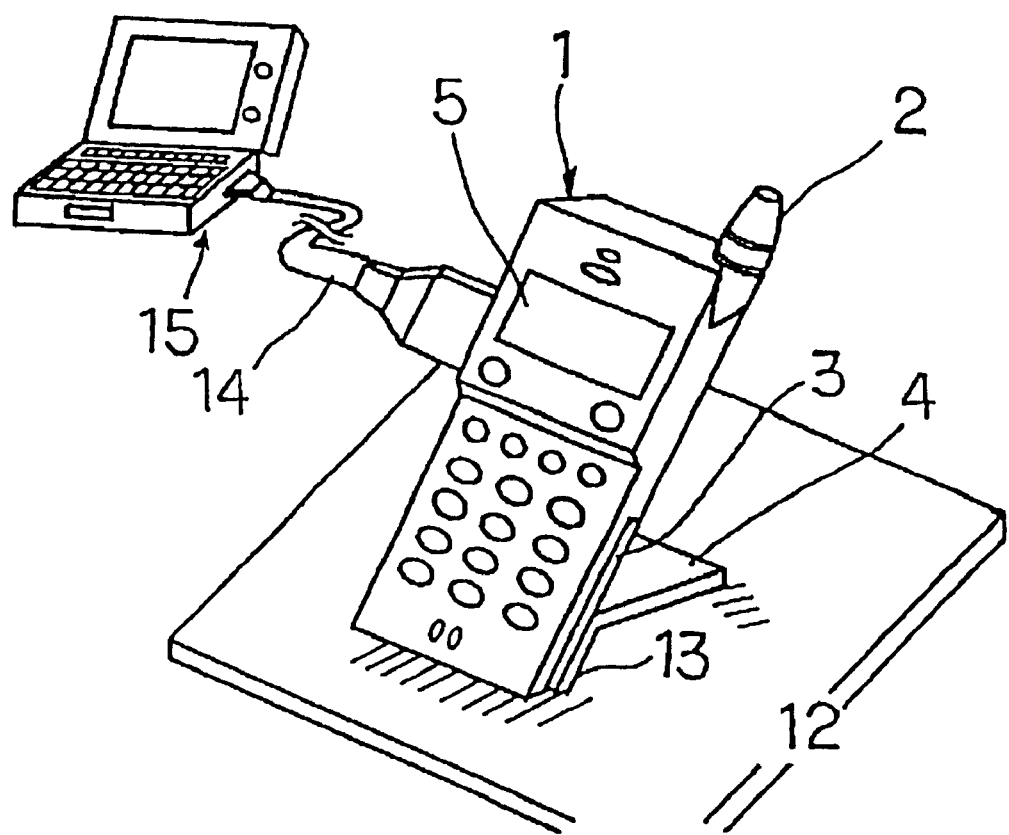
FIG. 8 is a diagram illustrating a case where the first embodiment of the present invention and a portable mobile terminal are used in connection with each other.

As shown in FIG. 8, when connector 14 for data communication cable of portable terminal 15 is connected to a side surface (the position of attachment is not limited thereto) of portable unit 1, data communication can be stably operated with manipulations of portable terminal 15.

What is claimed is:

1. A portable type mobile radio telephone apparatus comprising:

an antenna for transmitting and receiving radio waves;

a transmitter/receiver portion including a microphone/speaker; and flip board opening/closing means for allowing a flip board which covers a manipulation portion, said flip board opening/closing means having a rotational axis for opening and closing at a lower portion of a back surface of said apparatus, covers a manipulation surface of said manipulation portion and a lower portion of said apparatus, and facilitates stably upright placement, said flip board opening/closing means having a two-level stopper, said stopper being formed such that a tab is provided at said rotational axis at a lower portion of said flip board and two grooves are provided at a rotating portion on a side of said portable apparatus, said grooves intersecting at a common point thereby enabling said tab to freely travel within said grooves such that said flip board freely opens and closes with an opening/closing range of 270 degrees or more about a rotational axis at a lower portion of said flip board.

2. A portable type mobile radio telephone apparatus comprising:

an antenna for transmitting and receiving radio waves;

a transmitter/receiver portion including a microphone/speaker; and flip board opening/closing means for allowing a flip board which covers a manipulation portion, said flip board opening/closing means having a shape with a bend at an angle of 90 to 110 degrees corresponding to a manipulation surface of said manipulation portion and a lower edge surface of said apparatus or a streamlined shape to locate a rotational axis of said flip board at a lower portion of a back surface of said apparatus, and facilitates stably upright placement, said flip board opening/closing means having a three-level stopper, said stopper being formed such that a tab is provided at said rotational axis at a lower portion of said flip board and three grooves are provided at a rotating portion on a side of said portable apparatus, said grooves intersecting at a common point thereby enabling said tab to freely travel within said grooves such that said flip board freely opens and closes with an opening/closing range of 270 degrees or more about a rotational axis at a lower portion of said flip board.

3. The apparatus according to claim 1 wherein said tab and grooves are one of (a) a triangular shape, and (b) a semicircular shape.

4. The apparatus according to claim 2 wherein said tab and grooves are one of (a) a triangular shape, and (b) a semicircular shape.

* * * * *